(12) United States Patent
Haas et al.

(10) Patent No.: US 9,694,783 B2
(45) Date of Patent: Jul. 4, 2017

(54) CHILD SAFETY SEAT

(71) Applicant: BRITAX RÖMER Kindersicherheit GmbH, Ulm (DE)

(72) Inventors: Martin Haas, Steinheim (DE); Richard Henseler, Ulm (DE); Michael Grohspietsch, Neu-Ulm (DE); Michael Blum, Lanshausen (DE)

(73) Assignee: BRITAX RÖMER KINDERSICHERHEIT GMBH, Ulm (DE)

( * ) Notice: Subject to any disclaimer, the term of this patent is extended or adjusted under 35 U.S.C. 154(b) by 2 days.

(21) Appl. No.: 14/199,390

(22) Filed: Mar. 6, 2014

(65) Prior Publication Data

US 2014/0265471 A1 Sep. 18, 2014

(30) Foreign Application Priority Data

Mar. 13, 2013 (EP) .................................... 13001256

(51) Int. Cl.
*B60N 2/28* (2006.01)
*B60R 22/02* (2006.01)
*B60R 22/14* (2006.01)
*B60N 2/26* (2006.01)
*B60N 2/42* (2006.01)

(52) U.S. Cl.
CPC .............. *B60R 22/14* (2013.01); *B60N 2/265* (2013.01); *B60N 2/283* (2013.01); *B60N 2/2803* (2013.01); *B60N 2/2851* (2013.01); *B60N 2/2866* (2013.01); *B60N 2/2884* (2013.01); *B60N 2/4207* (2013.01); *B60R 22/024* (2013.01)

(58) Field of Classification Search
CPC ........ B60N 2/2866; B60R 22/02; B60R 22/16
USPC ...................................... 297/250.1, 482, 483
See application file for complete search history.

(56) References Cited

U.S. PATENT DOCUMENTS

| | | | | |
|---|---|---|---|---|
| 3,306,662 A | * | 2/1967 | Finnigan ....................... | 297/482 |
| 3,883,053 A | * | 5/1975 | Pritchard et al. ............. | 297/483 |
| 4,759,588 A | * | 7/1988 | Husnik ......................... | 297/468 |
| 4,887,318 A | * | 12/1989 | Weinreb ........................ | 297/482 |
| 5,294,183 A | * | 3/1994 | Wetter et al. ................. | 297/472 |

(Continued)

FOREIGN PATENT DOCUMENTS

WO 2012129613 A1 10/2012

OTHER PUBLICATIONS

European Search Report and Written Opinion mailed Jul. 18, 2013 of corresponding Application No. 13001256.0,all enclosed pages cited.

*Primary Examiner* — Timothy J Brindley
(74) *Attorney, Agent, or Firm* — McNair Law Firm, P.A.

(57) ABSTRACT

The child safety seat for transporting a child in a vehicle is configured for the child to be secured to the child safety seat with a safety belt of the vehicle, and is characterized in that the child safety seat comprises a belt pad which is adapted to be arranged on the safety belt. The belt pad of the child safety seat preferably comprises a lower component and an upper component, wherein the lower component is configured to be positioned between the safety belt and the child when the child is seated in the child safety seat and is secured in the child safety seat with the safety belt, and wherein the upper component is configured to be positioned on the side of the safety belt opposite to the side the lower component is positioned on.

16 Claims, 9 Drawing Sheets

(56) References Cited

U.S. PATENT DOCUMENTS

| | | | |
|---|---|---|---|
| 5,468,020 A | | 11/1995 | Scime |
| 5,829,834 A | * | 11/1998 | Silverman ............ B60N 2/2803 297/250.1 |
| 5,911,479 A | * | 6/1999 | Atkinson ...................... 297/482 |
| 6,322,149 B1 | * | 11/2001 | Conforti et al. .............. 297/482 |
| 6,471,298 B2 | * | 10/2002 | Carine et al. ................. 297/483 |
| 7,971,908 B2 | * | 7/2011 | Hathaway et al. ........... 280/808 |
| 2005/0012372 A1 | * | 1/2005 | Baloga et al. ........... 297/256.15 |

\* cited by examiner

CHILD SAFETY SEAT

CROSS-REFERENCE TO RELATED APPLICATION

This application claims priority to and the benefit of European Patent Application No. 13001253.0, filed Mar. 13, 2013, the contents of which are hereby incorporated by reference in entirety.

FIELD OF THE INVENTION

The present invention relates to a child safety seat and, more particularly, to a child safety seat for use in a vehicle, the child safety seat being designed to increase the level of protection provided to a child seated in the child safety seat. In particular, the child safety seat is designed to offer improved protection in various crash configurations, in particular in pure frontal or offset frontal crash configurations.

BACKGROUND

Child safety seats are employed for safely transporting children in vehicles, in particular in cars. There is a large variety of child safety seats adapted for transporting children of different age ranges. In Europe, with standards ECE R 44/03 and ECE R 44/04 a system of groups has been established for categorizing child safety seats. This system ranges from "Group 0" seats suitable for newborn children via "Group 1" and "Group 2" seats up to "Group 3" seats suitable for children up to twelve years old. Based on these basic groups there exist additional groups like "Group 0+" or extended groups like "Group 1-2", "Group 2-3", or "Group 1-2-3". Besides the age of a child, other factors that have to be taken into account when choosing a child safety seat for a specific child include the weight and the height of the child.

Group 2-3 child safety seats or comparable child safety seats are suitable for children with a weight in the range of 15 to 36 kg which approximately corresponds to an age in the range of about 4 to 12 years. Conventionally, child safety seats of this type are not equipped with an integral harness system for securing a child seated in the child safety seat. Instead, a child seated in such a child safety seat is secured to the child safety seat with one of the safety belts provided in the vehicle the child safety seat is placed in. If, for example, the child safety seat is placed on the left backseat of a vehicle, a child sitting in the child safety seat will be secured for transport with the safety belt associated with the left backseat. In conventional vehicles, this safety belt is a three-point belt, i.e. a belt comprising a lap strap and a shoulder strap. The lap strap is designed to be guided across the lap of a vehicle occupant's lap, whereas the shoulder strap is designed to be guided diagonally across one of the vehicle occupant's shoulders, over the chest, and down to a buckle where it meets the lap strap.

In some Group 2-3 child safety seats the vehicle's safety belt is used both to secure the child to the child safety seat and to fasten the child safety seat to one of the vehicle's seats. In other Group 2-3 child safety seats the vehicle's safety belt is used exclusively to secure the child to the child safety seat, whereas dedicated means, such as the loops and latches of the ISOFIX system, are used to fasten the child safety seat to one of the vehicle's seats. The present invention relates to both types of Group 2-3 child safety seats. With both types, the child safety seat serves as a means to raise the child in order to adapt its height to the geometry of the safety belt of the vehicle. Therefore, these types of child safety seats are often referred to as "booster seats".

Group 2-3 child safety seats are designed to be mounted in a vehicle in a forward-facing orientation, i.e. in such a way that a child positioned in the child safety seat faces the front of the vehicle carrying the child safety seat (provided that the vehicle's seat the child safety seat is placed on itself is forward-facing). Therefore, when such a child safety seat is installed in a vehicle, the backrest of the child safety seat rests on the backrest of the vehicle's seat the child safety seat is placed on. Due to this orientation of the child safety seat, in a frontal crash of the vehicle carrying the child safety seat, the crash-induced displacement of a child sitting in the child safety seat towards the front of the vehicle is suppressed only by the safety belt of the vehicle that is used to secured the child in the child safety seat. Since the seat belts of a vehicle are adjusted to the anatomy of an adult, however, these safety belts are not fully optimized for restraining a child in a child safety seat. In particular, the head excursion experienced by a child sitting in a child safety seat during a frontal crash and the loads applied to the child during the crash cannot be controlled sufficiently with many conventional child safety seats.

SUMMARY OF EMBODIMENTS OF THE INVENTION

The present invention relates to Group 2-3 child safety seats or comparable child safety seats, i.e. to child safety seats that are suitable for children with a weight in the range of 15 to 36 kg which approximately corresponds to an age in the range of about 4 to 12 years.

Therefore, it is an object of the present invention to provide a child safety seat which offers improved protection to a child sitting in the child safety seat during a frontal crash.

This object is solved by the child safety seat for transporting a child in a vehicle with the features of claim 1 and with the use of a belt pad with a child safety seat in accordance with claim 15. Advantageous embodiments of the present invention are indicated in subclaims 2 to 14.

The child safety seat for transporting a child in a vehicle in accordance with the invention is configured for the child to be secured to the child safety seat with a safety belt of the vehicle and comprises a belt pad which is adapted to be arranged on the safety belt.

With this belt pad the efficiency of the safety belt in restraining a child in the child safety seat can be improved. This is of particular importance since the safety belt of the vehicle itself is optimized for restraining adult passengers, not children. The belt pad allows to adapt the safety belt of the vehicle to the characteristics of a child's body. As a result, the protective effect of the child safety seat is enhanced.

The belt pad of the child safety seat of the invention preferably comprises a lower component and an upper component, wherein the lower component is configured to be positioned between the safety belt and the child when the child is seated in the child safety seat and is secured in the child safety seat with the safety belt, and wherein the upper component is configured to be positioned on the side of the safety belt opposite to the side the lower component is positioned on.

Since the lower component of the belt pad is configured to be positioned between the safety belt and the child, the safety belt of the vehicle will not be in full contact with the child. Forces exerted on the child by the safety belt during a crash of the vehicle will therefore be transferred to the child by the lower component of the belt pad. The lower component of the belt pad therefore allows control of the forces acting on the child during a crash of the vehicle.

Since the upper component of the belt pad is configured to be positioned on the side of the safety belt opposite to the side the lower component is positioned on, the upper component will face away from the child when the child is fixed to the child safety seat with the safety belt of the vehicle and the belt pad is properly installed on the safety belt. The lower component of the belt pad will then be sandwiched between the chest area of the child and the safety belt, whereas the upper component of the belt pad will rest on the side of the safety belt facing away from the chest of the child. While the lower component will take effect mostly during early stages of a front crash of the vehicle carrying the child safety seat, the upper component will take effect mostly during later stages of the crash.

Advantageously, the belt pad is configured to be transferable between two configurations: an open configuration and a closed configuration. In the open configuration a section of the safety belt can be inserted into the belt pad. If the belt pad is transferred into the closed configuration after the safety belt has been inserted into the belt pad, the safety belt is locked in the belt pad. In order to remove the safety belt from the belt pad, the belt pad has to be opened, i.e. transferred from the closed configuration to the open configuration. In the open configuration, the safety belt can then be removed from the belt pad. Configuring the belt pad of the invention to be transferable between an open configuration and a closed configuration is advantageous since in this way the belt pad, which is a part of the child safety seat, can be easily installed on and removed from the safety belt, which is a part of the vehicle the child safety seat is placed in. Since the belt pad is a component of the child safety seat whereas the safety belt is a component of the vehicle, the belt pad cannot be permanently installed on the safety belt. Therefore, it is particularly advantageous to provide for the belt pad to be easily attached to or removed from the safety belt.

Preferably, the belt pad comprises a positioning element which is adapted to control the placement of the upper component relative to the lower component in the closed configuration of the belt pad. Advantageously, the positioning element comprises a projecting component and a recess, wherein the recess is configured to receive the projecting component in the closed configuration of the belt pad. Preferably, the upper component of the belt pad comprises the projecting component and the lower component of the belt pad comprises the recess or vice versa. Since the belt pad can only be properly closed if the projecting component is completely inserted into the recess, the positioning element simplifies correct closing of the belt pad.

The upper component is preferably hingedly connected to the lower component. Transfer of the belt pad between the open configuration and the closed configuration can then be achieved by folding the upper component towards or away from the lower component. To open the closed belt pad, the upper component is folded away from the lower component. To close the opened belt pad, the upper component is folded towards the lower component.

The belt pad of the child safety seat in accordance with the invention preferably comprises a locking device. The locking device is configured to releasably lock the belt pad in the closed configuration. In order to open the closed belt pad for removal of the safety belt, the locking device has to be unlocked. Then the belt pad can be opened and the safety belt can be removed. Therefore, the locking device ensures that the safety belt is not accidentally removed from the belt pad.

In the child safety seat of the invention, the lower component of the belt pad preferably comprises a first damping element and the upper component of the belt pad preferably comprises a second damping element.

With the first damping element of the lower component of the belt pad the forces exerted on the child by the safety belt can be cushioned. Since the second damping element is comprised by the upper component of the belt pad, it is placed on the side of the safety belt facing away from the child's chest when the child is secured in the child safety seat with the safety belt. In the course of a front crash of the vehicle carrying the child safety seat, the head of the child sitting in the child safety seat will rotate forwards. This head rotation heavily strains the child's neck and head. In conventional child safety seats, this head rotation is not controlled. With the child safety seat of the invention, however, the belt pad can be configured to reduce the head rotation during a frontal crash. If the belt pad is placed in the central area of the child's chest, the belt pad is positioned below the child's head. Therefore, the belt pad is conveniently configured to receive the child's chin as the child's head rotates forward. As a result, with the belt pad of the invention head rotation can be controlled by cushioning the head's impact on the belt pad. Preferably, the second damping element of the upper component of the belt pad is adapted to cushion the impact of the child's chin on the belt pad. Alternatively, the first damping element of the lower component of the belt pad may be adapted to cushion the impact of the child's chin on the belt pad. Preferably, both first and second damping element cooperate in cushioning the impact of the child's chin on the belt pad. While best results will be achieved with a belt pad comprising a first damping element and a second damping element as described above, the belt pad of the child seat of the invention may comprise only a single damping element. In accordance with the invention, this single damping element may be comprised by the upper component of the belt pad or by the lower component of the belt pad.

Advantageously, the first and/or second damping element comprises a foam-like structure comprising thermoplastics or alternative structural elements with damping characteristics. The thermoplastics preferably comprise crosslinked polyethylene (XPE), expanded polystyrene (EPS), expanded polypropylene (EPP), or expanded polyethylene (EPE). Advantageously, the foam-like structure comprises a particle foam or a high-pressure foam or an extruded foam or a crosslinked foam or a foam which is not crosslinked or a closed-cell foam or an open cell foam. In a preferred embodiment the foam-like structure comprises an EPS or PS closed-cell particle foam, such as Styropor®. In another preferred embodiment the foam-like structure comprises a PE or PP crosslinked, closed-cell particle foam, such as Neoplen®, Eperan®, or Polypropylen. In another preferred embodiment the foam-like structure comprises a PE or PP crosslinked, closed-cell high-pressure foam, such as Plastazote®, Evazote®, Microlen®, or XPE®. In another preferred embodiment the foam-like structure comprises a PE or PP closed-cell extruder foam which is not crosslinked, such as Ethafoam®, Nopaplank®, Polylam®, or PL300®.

Preferably, the first damping element accounts for at least 90% of the weight of the lower component of the belt pad of the child safety seat in accordance with the invention. Preferably, the second damping element accounts for at least 90% of the weight of the upper component of the belt pad of the child safety seat in accordance with the invention. If first and second damping element account for most of the weight of the belt pad, the entire belt pad can be made to be highly resilient. With such a highly resilient belt pad a particularly high level of protection can be achieved in a crash of the vehicle carrying a child safety seat equipped with the belt pad.

Advantageously, the first damping element comprises a first chamber configured to hold a fluid or a gas and the second damping element comprises a second chamber configured to hold a fluid or a gas. The first and second chamber are connected in such a way that fluid or gas can be exchanged between the first and second chamber. Preferably, the first chamber is configured to expel fluid or gas into the second chamber when being compressed. Therefore, compression of the first chamber will result in expansion of the second chamber. Since the first chamber is arranged in the lower component of the belt pad which is designed to be positioned between the child's chest and the safety belt, during a front crash the first chamber will be compressed by the child's chest pressing the first chamber against the safety belt. As a result, the second chamber will expand. Since the second chamber is arranged in the upper component of the belt pad which is designed to be positioned on the side of the safety belt facing away from the child's chest, the component of the belt pad controlling rotation of the child's head will be expanded during the crash. The expanded component is particularly suited to cushion the head's impact on the belt pad.

Preferably, the Shore A number of the first damping element of the lower component is in the range of 17 to 22. Preferably, the Shore A number of the second damping element of the upper component is in the range of 20 to 25. Advantageously, the first damping element of the lower component has a lower Shore A hardness than the second damping element of the upper component. Head rotation can then be reliably controlled with the belt pad of the child safety seat of the invention. During a frontal crash, the first damping element of the lower component is compressed between the seat belt and the child. Therefore, a lower Shore A hardness of the first damping element of the lower component is advantageous to allow the lower component to be compressed. The second damping element of the upper component, however, is compressed by the child's chin or face which is a considerably smaller area. Therefore, a higher Shore A hardness of the second damping element of the upper component is advantageous to achieve ideal energy absorption.

The child seat of the invention preferably comprises a fastening device connecting the belt pad to the child safety seat. This fastening device ensures that the belt pad will always be at hand when needed to securely fix a child in the child safety seat with a seat belt of the vehicle. Furthermore, with the fastening device the belt pad can be placed in the child safety seat in a convenient position.

The fastening device advantageously comprises a strap of adjustable length. With this strap of adjustable length the position of the belt pad can be adjusted to the size of a child sitting in the child safety seat of the invention. The length of the strap required to correctly position the belt pad on a young child is different from the length of the strap required to correctly position the belt pad on an older child. With the strap of adjustable length the length of the strap can be easily adjusted. Advantageously, the strap of adjustable length comprises an elastic strap. Preferably, this elastic strap is adapted to adjust the length of the strap to the size of children in the age range of 3 to 12 years.

The child safety seat of the invention preferably comprises a backrest and a headrest, wherein the headrest is mounted to the backrest to be adjustable in height, and wherein the fastening device is connected to the headrest.

With the height adjustable headrest the child safety seat can be adjusted to the size of a child as it is growing. If the fastening device is connected to the height adjustable headrest, the position of the belt pad connected to the fastening device will be automatically adjusted whenever the height of the headrest is adjusted. Correct placement of the belt pad for children of different size is thus simplified.

In the child safety seat of the invention the headrest preferably comprises a coupling component for coupling the headrest to the backrest and the fastening device is preferably rotatably connected to the back of the headrest above the coupling component to allow the fastening device to be guided from the back of the headrest to the front of the backrest optionally either across an edge of the backrest located to the left of the coupling component or across an edge of the backrest located to the right of the coupling component.

With this configuration the belt pad can be conveniently used to safely fix a child in the child safety seat of the invention regardless of the position of the child safety seat in the vehicle.

The belt pad of the child safety seat in accordance with the invention preferably comprises a belt guiding channel configured to receive a section of the safety belt of the vehicle.

This belt guiding channel is adapted to guide the safety belt of the vehicle through the belt pad and to ensure that the safety belt runs smoothly through the belt pad. Advantageously, the belt guiding channel comprises a recessed section of the lower component of the belt pad. The width of this recessed section slightly exceeds the width of the safety belt. Preferably, the belt guiding channel is configured to be closed from above by the upper component of the belt pad. Consequently, when a safety belt is guided through this belt guiding channel, it runs through the recessed section of the lower component and is prevented from being removed from the belt guiding channel by the upper component of the belt pad.

The belt guiding channel of the belt pad of the child safety seat in accordance with the invention preferably comprises a friction reducing structure adapted to ensure that the area of contact between the belt pad and the safety belt is smaller than the surface area of the section of the safety belt guided through the belt guiding channel.

This friction reducing structure ensures that the safety belt does not fully contact the belt pad. As a result, the friction between the safety belt and the belt pad is reduced. Thus, the force required to pull the safety belt across the belt pad is reduced. Therefore, with a belt guiding channel comprising a friction reducing structure, safe webbing retraction and reliable tensioning of the safety belt can be achieved.

The belt pad of the child safety seat of the invention preferably comprises a cover covering at least a part of the belt guiding channel. With this cover the friction between a safety belt guided through the belt guiding channel and the belt pad can be further reduced. Advantageously, the cover completely covers the lower component of the belt pad or the upper component of the belt pad or both the lower and the upper component of the belt pad. Preferably, the coefficient of kinetic friction between the belt pad and a typical safety belt of a vehicle, which comprises a fabric of polyamide fibres, is 0,5 or lower. Advantageously, the coefficient of kinetic friction is in the range of 0,3 to 0,4.

The cover of the belt pad preferably comprises a mixture of polyamide and elastane fibres. With this mix of fibres an elastic cover can be obtained which is suited to be adjusted to the contour of the belt pad. Elastane fibres, which are also known as spandex fibres, are highly elastic synthetic fibres. The polyamide fibres increase the durability and robustness of the cover. The percentage of weight of polyamide fibres in the cover in accordance with the invention is in the range of 80% to 90%. Consequently, the elastane fibres account for 10% to 20% of the weight of the cover. Preferably, the cover comprises 85% polyamide fibres and 15% elastane fibres. In a preferred embodiment, the cover comprises a 170 g knit fabric with 80% polyamide fibres and 20% elastane fibres. Advantageously, the fibres of the cover are not coated. With this cover, in combination with the friction reducing structure of the belt guiding channel, a coefficient of kinetic friction in the range of 0,3 to 0,4 can be achieved.

Instead of polyamide, the cover might comprise other fibres, such as viscose fibres, polyester fibres, polypropylene fibres, or cotton fibres. Preferably, these fibres are combined with elastane fibres to create a knit fabric.

Advantageously, the cover comprises a textile finish, such as a nanosphere surface, a stain protection, or a water repellent surface. Preferably, the cover comprises special yarns or fibres, such as hollow fibres resulting in a breathable, antiperspirant cover, or silver threads resulting in an antibacterial and odor resistant cover, or coolmax fibres resulting in an antiperspirant, breathable cover.

The belt pad of the child safety seat in accordance with the invention preferably comprises a rigid skeleton comprising a lower part and an upper part configured to guide the safety belt between the lower part and the upper part, wherein the first damping element is arranged on the lower part and the second damping element is arranged on the upper part.

With this rigid skeleton the friction between a safety belt of a vehicle and the belt pad can be further reduced. Advantageously, the rigid skeleton comprises rolls configured to support the safety belt. These rolls serve as a roller bearing for the safety belt. With this belt pad, the coefficient of kinetic friction between the belt pad and the safety belt can be minimized. Furthermore, with the rigid skeleton the belt guiding channel of the belt pad can be conveniently designed to show a constant clearance. A constant clearance helps to ensure that the safety belt runs smoothly through the belt pad.

Preferably, the child safety seat of the invention does not comprise an integral harness for securing the child in the child safety seat. Therefore, a safety belt of the vehicle the child safety is installed in is the only means available for securing a child in the child safety seat of the invention. The belt pad of the child safety seat of the invention is designed to be attached to a safety belt of the vehicle, i.e. to a safety belt designed to restrain an adult, not to a belt provided in the child safety seat. Advantageously, the child safety seat of the invention is a Group 2-3 child safety seat.

Improved protection of a child during a frontal crash is furthermore achieved by the use of a belt pad with a child safety seat for transporting a child in a vehicle, wherein the child safety seat is configured for the child to be secured to the child safety seat with a safety belt of the vehicle, and wherein the belt pad is arranged on the safety belt. With the belt pad arranged on the safety belt of the vehicle the protective effect of the safety belt can be enhanced. In particular, the safety belt of the vehicle, which is designed to restrain an adult, can be adjusted to the characteristics of the child's anatomy.

BRIEF DESCRIPTION OF THE DRAWINGS

Specific embodiments of the invention will now be described by way of example and with reference to the accompanying drawings, in which:

FIG. 4b is a side view of the belt pad of FIG. 4a;

FIG. 5b is a sectional view along line X-X of FIG. 5a;

FIG. 6b is a side view of a belt pad comprising the component of FIG. 6a;

FIG. 7b is another perspective view of the belt pad of FIG. 7a;

DETAILED DESCRIPTION

Figure 1A:
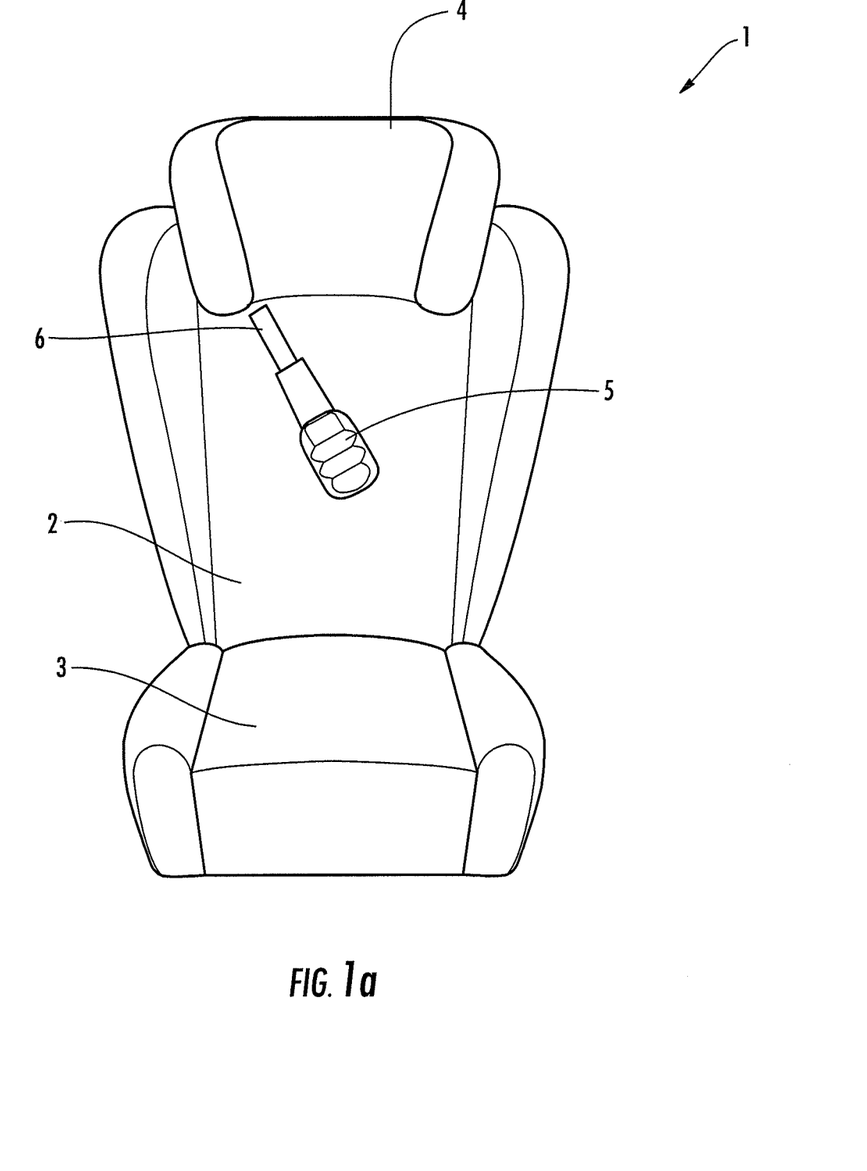
FIG. 1a is a front view of a child safety seat in accordance with a first embodiment of the invention.

FIG. 1a shows a child safety seat 1 for transporting a child in a vehicle in accordance with a first embodiment of the invention. The child safety seat 1 comprises a backrest 2 and a seat member 3. The child safety seat 1 furthermore comprises a headrest 4 which is attached to the backrest 2 in an upper region of the backrest 2. Preferably, the headrest 4 is configured to be adjustable in height in order to allow the headrest's 4 height to be adjusted to the size of a child positioned in the child safety seat 1. The child safety seat 1 furthermore comprises a belt pad 5. In the embodiment of the invention shown in FIG. 1a the belt pad 5 is attached to the backrest 2 of the child safety seat 1 by an attachment strap 6.

Figure 1B:
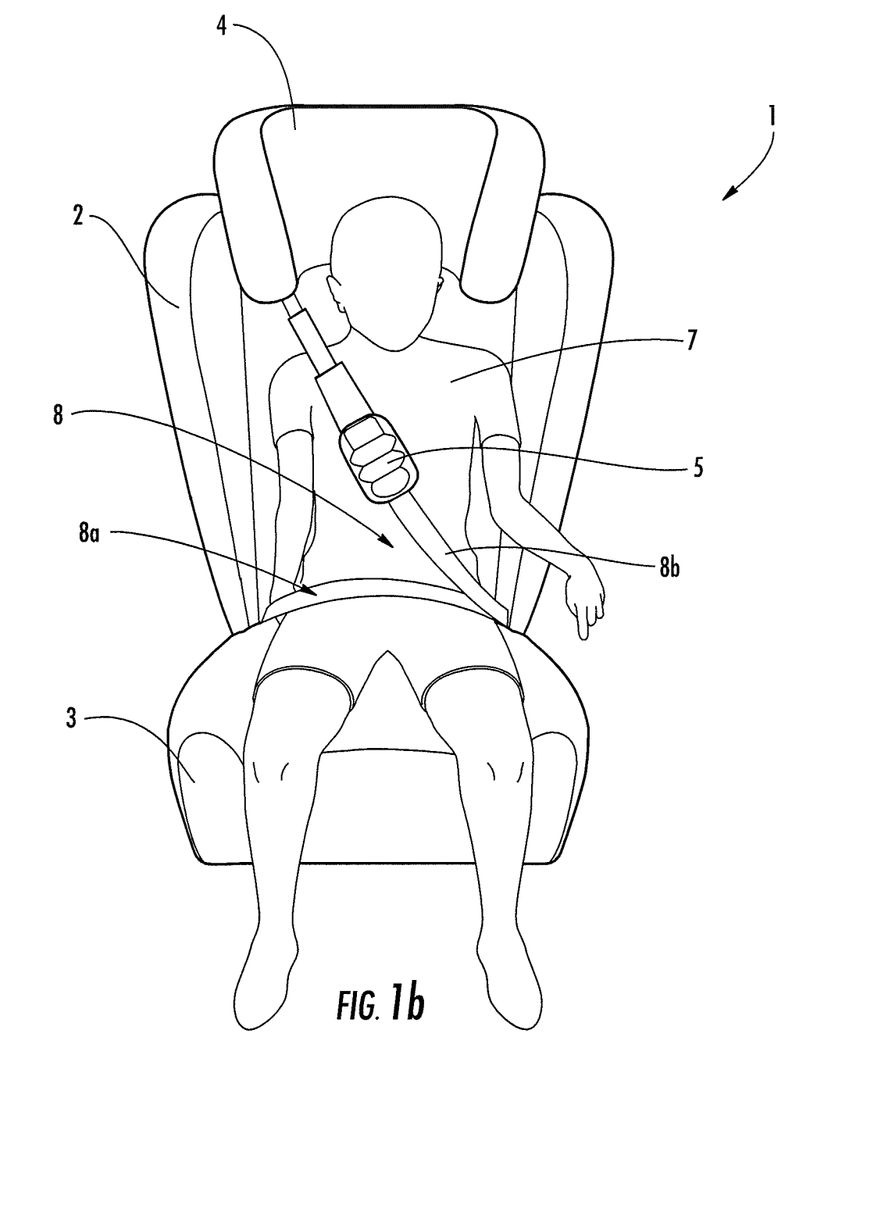
FIG. 1b is a front view of the child safety seat of FIG. 1a, wherein a child is seated in the child safety seat and secured to the child safety seat by a safety belt provided in a vehicle.

FIG. 1b shows the child safety seat 1 of FIG. 1a with a child 7 seated in the child safety seat 1. The child 7 is secured in the child safety seat 1 by a safety belt 8 which is provided by the vehicle (not shown in FIG. 1b) the child safety seat 1 is installed in. The safety belt 8 is a conventional three-point belt of the type found in all modern vehicles. The safety belt 8 comprises a lap strap 8a and a shoulder strap 8b. The shoulder strap 8b is guided diagonally across the torso of the child 7 and the lap strap 8a is guided essentially horizontally across the lap of the child 7. Furthermore, the shoulder strap 8b is guided through the belt pad 5. To allow the shoulder strap 8b to be guided through the belt pad 5, the belt pad 5 comprises an opening which is configured to receive a portion of the shoulder strap 8b. This opening separates the belt pad 5 into a first and into a second component. When the belt pad 5 is installed on the shoulder strap 8b, the first component of the belt pad 5 is positioned on one side of the shoulder strap 8b and the second component of the belt pad 5 is positioned on the opposite side of the shoulder strap 8b. Therefore, in FIG. 1b only the second component of the belt pad 5 is visible since the first component (as well as the attachment strap 6) is hidden from view by the shoulder strap 8b. The first component of the belt pad 5 is positioned between the torso of the child 7 and the shoulder strap 8b, whereas the second component of the belt pad 5 is positioned on top of the shoulder strap 8b, i.e. on the side of the shoulder strap 8b facing away from the torso of the child 7.

As shown in FIG. 1b, when properly installed the belt pad 5 is positioned in the chest area of the child 7 in such a way that the second component of the belt pad 5 is placed centrally on the chest of the child 7 below the child's 7 head. Preferably, the attachment strap 6 is configured to allow the position of the belt pad 5 to be adjusted to the size and shape of the child 7.

Figure 2:
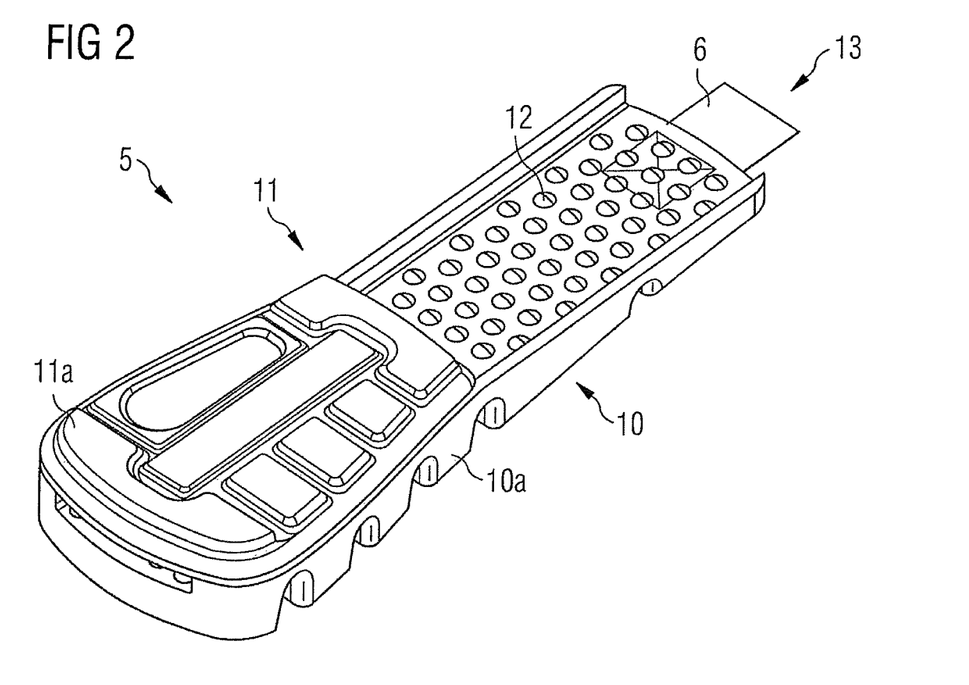
FIG. 2 is a perspective view of a belt pad of a child safety seat in accordance with the invention.

FIG. 2 shows a perspective view of a belt pad 5 in accordance with the invention. The belt pad 5 comprises a lower component 10 and an upper component 11. The lower component 10 comprises a first damping element 10a and the upper component comprises a second damping element 11a. The lower component 10 is partly provided with a friction reducing structure 12. This friction reducing structure 12 consists of a plurality of knops, preferably arranged in a regular pattern. Furthermore, an attachment strap 6 is attached to the lower component 10. Preferably, the attachment strap 6 is sewed to the lower component 10. The lower component of the belt pad 5 furthermore comprises a belt guiding channel 12. The belt guiding channel 12 is configured to receive a portion of a safety belt of a vehicle. Therefore, the width of the belt guiding channel 12 slightly exceeds the width of a conventional safety belt. In the configuration of the belt pad 5 shown in FIG. 2 the upper component 11 is arranged above the lower component 10 and partially covers the belt guiding channel 13 from above.

The upper component 11 is hingedly connected to the lower component 10. Thus, from the closed configuration of the belt pad 5, the upper component 11 can be folded to an open configuration.

Figure 3:
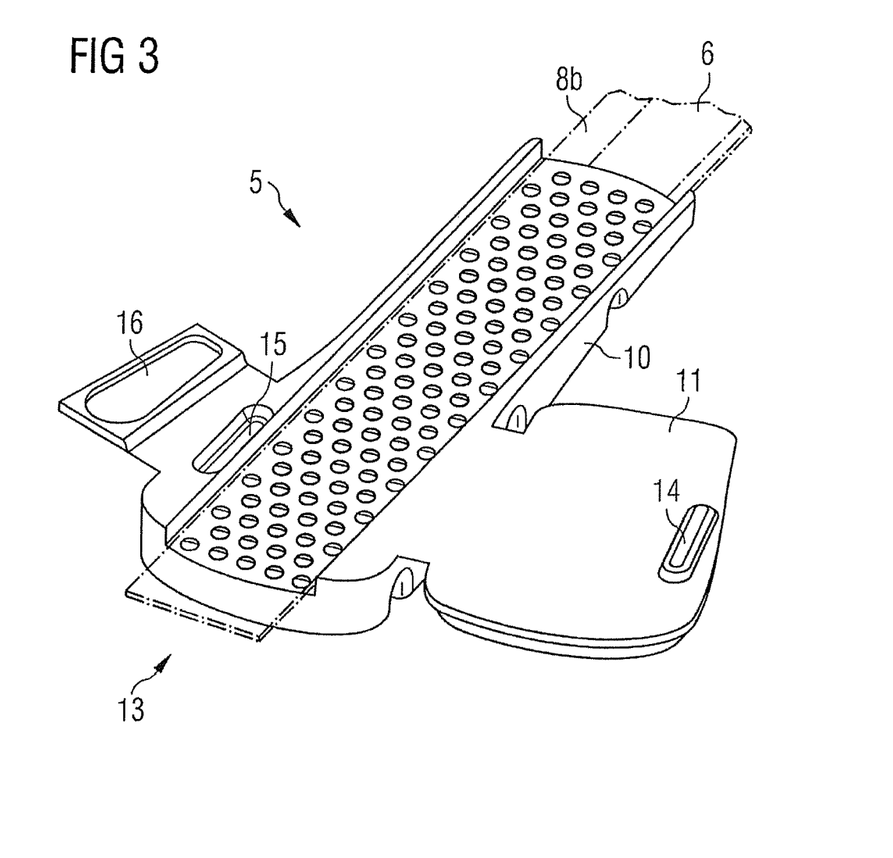
FIG. 3 is a perspective view of the belt pad of FIG. 2 in an opened state with a safety belt guided through the belt pad.

This open configuration of the belt pad 5 is shown in FIG. 3. The upper component 11 is folded away from the lower component 10 and therefore does not cover the belt guiding channel 13. Consequently, a portion of a safety belt, such as shoulder strap 8b (semitransparent in FIG. 3), can be inserted into the belt guiding channel 13. The friction reducing structure 12 of the lower component 10 extends along the complete length of the belt guiding channel 13. Thus, the friction between the shoulder strap 8b and the lower component 10 of the belt pad 5 can be minimized. The knobs of the friction reducing structure 12 serve to minimize the area of contact between the shoulder strap 8b and the lower component 10. As will be appreciated by a person skilled in the art, in a belt pad in accordance with the invention the friction reducing structure 12 may comprise structural elements other than knops, such as pyramidal, cubic, prismatic, or wavelike structural elements. Any arrangement of such structural elements that reduces the area of contact between the shoulder strap 8b and the lower component 10 may represent a friction reducing structure 12 in accordance with the invention.

The upper component 11 preferably comprises a positioning element. In the embodiment of the belt pad 5 shown in FIG. 3, this positioning element comprises an elongated projection 14 arranged on the surface of the upper component 11 facing the lower component 10 in the closed configuration of the belt pad 5 shown in FIG. 2. The lower component 10 furthermore comprises a recess 15 which is configured to receive the elongated projection 14 when the belt pad 5 is closed. Since the belt pad 5 can only be properly closed if the elongated projection 14 is brought into engagement with the recess 15, elongated projection 14 and recess 15 assist a user of the belt pad 5 in properly closing the belt pad 5. A user attempting to close the belt pad 5 will adjust the position of the upper component 11 relative to the lower component 10 until the elongated projection 14 fits into the recess 15. Once this is achieved, the user can be sure that the belt pad 5 is properly closed.

The belt pad 5 shown in FIG. 3 furthermore comprises a locking device 16. With this locking device 16 the belt pad 5 can be locked in the closed configuration shown in FIG. 2. The locking device 16 preferably comprises a hook-and-loop fastener, a snap fastener, or a magnet. In this case, the upper component 11 is provided with a locking member which is configured to interact with the locking device 16 in order to lock the belt pad 5 in the closed configuration. To remove the shoulder strap 8b from a belt pad 5 which is locked in the closed configuration, the locking device 16 has to be unlocked. The belt pad 5 can then be opened by folding the upper component 11 away from the lower component 10 in order to uncover the belt guiding channel 13. The shoulder strap 8b can then be removed from the belt pad 5.

Figure 4A:
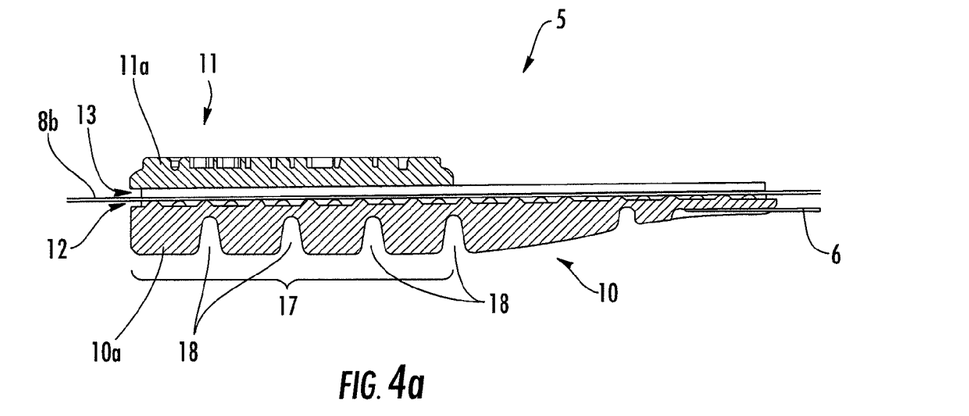
FIG. 4a is a sectional view of a belt pad of a child safety seat in accordance with the invention with a safety belt guided through the belt pad.

FIG. 4a shows a sectional view of the belt pad 5 of FIG. 2. In contrast to FIG. 2, however, a shoulder strap 8b which is guided in belt guiding channel 13 is shown to pass through belt pad 5 in FIG. 4a. FIG. 4a illustrates that with the knobs of the friction reducing structure 12 the area of contact between the shoulder strap 8b and the lower component 10 is reduced. The lower component 10 of belt pad 5 comprises a friction zone 17. This friction zone 17 comprises the first damping element 10a, is configured to be placed on the chest of a child sitting in the child safety seat of the invention, and is structured to provide a cushioning effect as well as increased friction between the belt pad 5 and the child's clothes as the second component 10 is being compressed. In the friction zone 17 the cushioning material of the second component 10 is generally thicker than in other areas of the second component 10. Therefore, in the friction zone 17 the cushioning effect of the second component 10 is particularly high. In the friction zone 17 the lower component 10 comprises four grooves 18 which extend along the complete width of the lower component 10. Therefore, the cushioning material of the lower component 10 is divided into four cushioning regions which can be compressed independently from each other. Furthermore, the grooves 18 increase the surface area of the lower component 10. This design of the friction zone 17 of the lower component 10 increases the friction between the belt pad 5 and the clothes of a child if, as is the case during a frontal crash, the belt pad 5 is pressed against the child. The belt pad 5 is then less likely to slip up towards the shoulder of the child. The friction zone 17 therefore helps to maintain the belt pad 5 at the desired location on the child's chest.

Figure 4B:
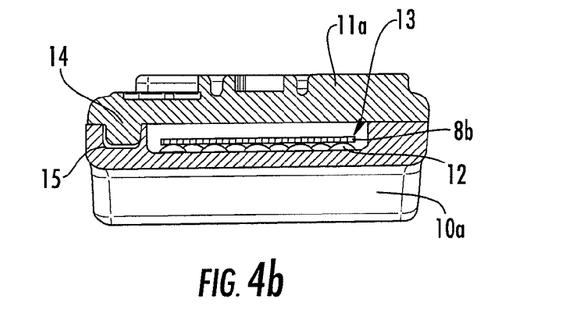

FIG. 4b shows a side view of the belt pad of FIG. 4a. In this view the belt guiding channel 13 is illustrated which is defined between the lower component 10 of the belt pad 5 and the upper component 11 of the belt pad 5. The belt guiding channel 13 has an approximately rectangular cross section. The side walls as well as the base of the belt guiding channel 13 are defined by the lower component 10, whereas the top of the belt guiding channel 13 is defined by the upper component 11. The base of the belt guiding channel 13 comprises the friction reducing structure 12 which is configured to reduce the area of contact between the lower component 10 and the shoulder strap 8b. FIG. 4b furthermore illustrates how, when the belt pad 5 is properly closed, the elongated projection 14 of the positioning element engages with the recess 15 of the positioning element.

Figure 5A:
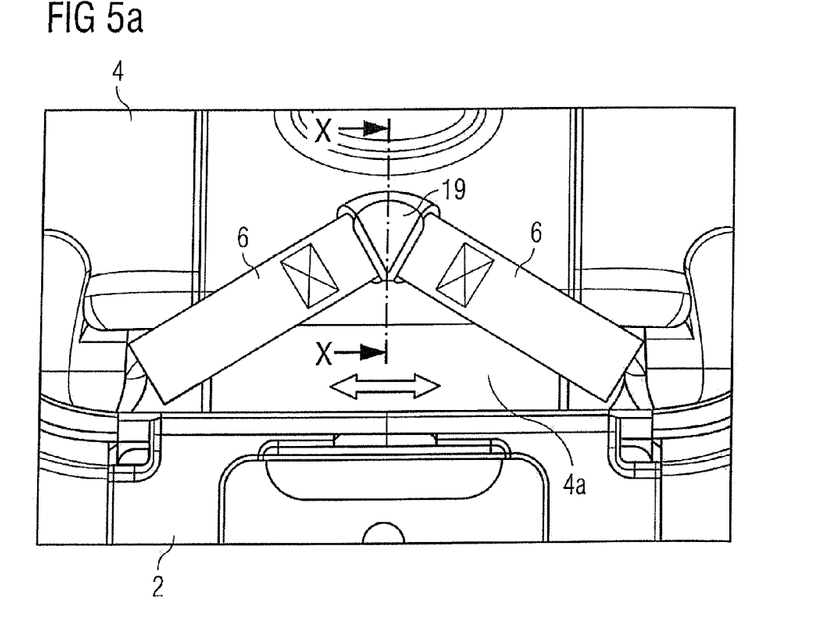
FIG. 5a is a detail of a rear view of a child safety seat in accordance with the invention showing the attachment of the belt pad to the headrest of the child safety seat.

FIG. 5a shows a detail of the back of a child safety seat in accordance with the invention illustrating how the attachment strap 6 is attached to the child safety seat. FIG. 5a shows a part of the headrest 4 comprising a coupling component 4a which is slidably coupled to the backrest 2. The headrest 4 comprises a strap fastener 19 which is rotatably mounted on the headrest 4. The strap fastener 19 is centrally arranged on the headrest 4. The attachment strap 6 is attached to the strap fastener 19. This construction allows the attachment strap 6 to be placed on either side of the coupling component 4a. In FIG. 5a both positions of the attachment strap 6 are shown: positioned on the left side of the coupling component 4a and positioned on the right side of the coupling component 4a. Since the strap fastener 19 is rotatably mounted on the headrest 4, the attachment strap 6 can be easily moved from one side of the coupling component 4a to the other side of the coupling component 4a. There is no need to detach the attachment strap 6 from the child safety seat in order to rearrange the attachment strap 6. Since the attachment strap 6 is permanently connected to the child safety seat, there is no risk of unintentionally losing or displacing the attachment strap 6 together with the belt pad 5 connected to it.

By rotating the attachment strap 6 to either side of the coupling component 4a, the position of the belt pad 5 can be adjusted to the position of the shoulder strap 8b. If the child safety seat is placed on the left backseat of a vehicle, the shoulder strap 8b will run from an upper left part of the backseat 2 of the child safety seat to a lower right part of the backrest 2.

Consequently, if a child is seated in the child safety seat, the shoulder strap 8b will run across the child's left shoulder. In this situation, the attachment strap 6 will advantageously be placed on the left side of the coupling component 4a. The attachment strap 6 can then also be guided over the child's left shoulder in order to place the belt pad 5 on the child's chest. Since both shoulder strap 8b and attachment strap 6 run across the child's left shoulder, the belt guiding channel 13 will be aligned with the shoulder strap 8b. Therefore, the shoulder strap 8b can run smoothly through the belt pad 5. If the child safety seat is placed on the right backseat of a vehicle, the shoulder strap 8b will run across the child's right shoulder. The attachment strap 6 is then advantageously placed on the right side of the coupling component 4a.

Figure 5B:
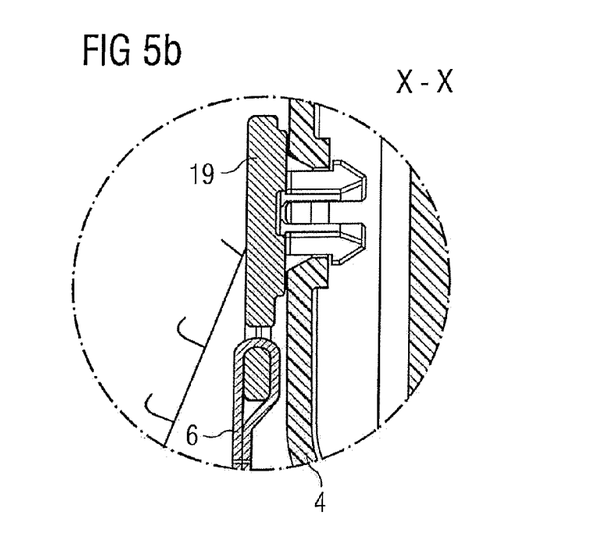

FIG. 5b shows a sectional view of the headrest 4 with attachment strap 6 and strap fastener 19 along line X-X of FIG. 5a. The headrest 4 comprises a circular hole which is configured to receive a projecting part of the strap fastener 19. The projecting part of the strap fastener 19 is configured to snap into the circular hole provided in the headrest 4. The strap fastener 19 can thus be freely rotated relative to the headrest 4 but is secured against being detached from the headrest 4 unintentionally. The end of the attachment strap 6 is formed into a loop which is used to connect the attachment strap 6 to the strap fastener 19. As a result, the attachment strap 6 together with the belt pad 5 is securely fixed on the child safety seat of the invention.

Figure 6A:
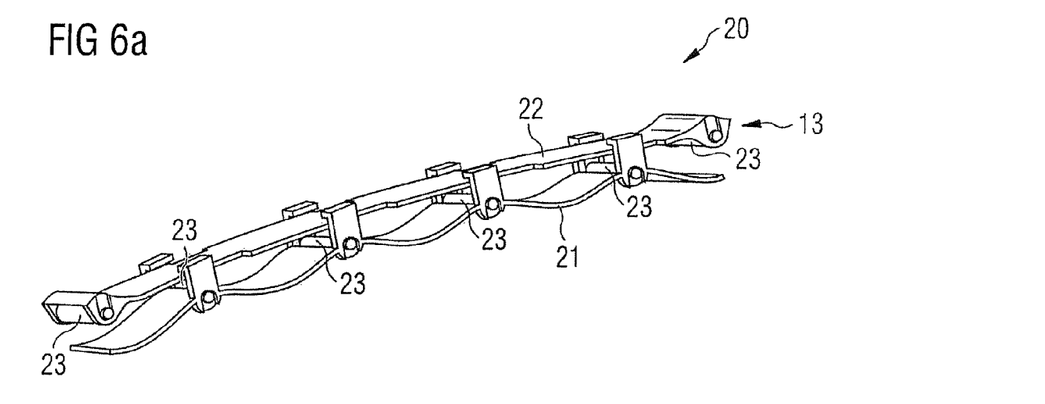
FIG. 6a is a perspective view of a component of a belt pad of a child safety seat in accordance with another embodiment of the invention.

FIG. 6a shows a component of another embodiment of a belt pad of a child safety seat in accordance with the invention. This component is designed to be combined with cushioning elements in order to build a belt pad for a child safety seat in accordance with the invention. The component shown in FIG. 6a is a rigid skeleton 20 comprising a lower part 21 and an upper part 22. The lower part 21 is configured to be clamped to the upper part 22. Lower part 21 and upper part 22 of the skeleton 20 are configured to define a belt guiding channel 13 if the lower part 21 is clamped to the upper part 22. The skeleton 20 furthermore comprises rolls 23 which are adapted to reduce the friction between a strap guided through the belt guiding channel 13 and the skeleton 20. In the embodiment shown in FIG. 6a, the lower part 21 comprises four rolls 23 whereas the upper part 22 comprises two rolls 23. The lower part 21 is essentially wave-shaped with the rolls 23 arranged on top of the waves, i.e. in those areas of the lower part 21 that are closest to the upper part 22 when lower 21 and upper 22 part are connected to each other.

Therefore, a strap guided through belt guiding channel 13 will rest on the rolls 23 of the lower part 21 of the skeleton 20.

Figure 6B:
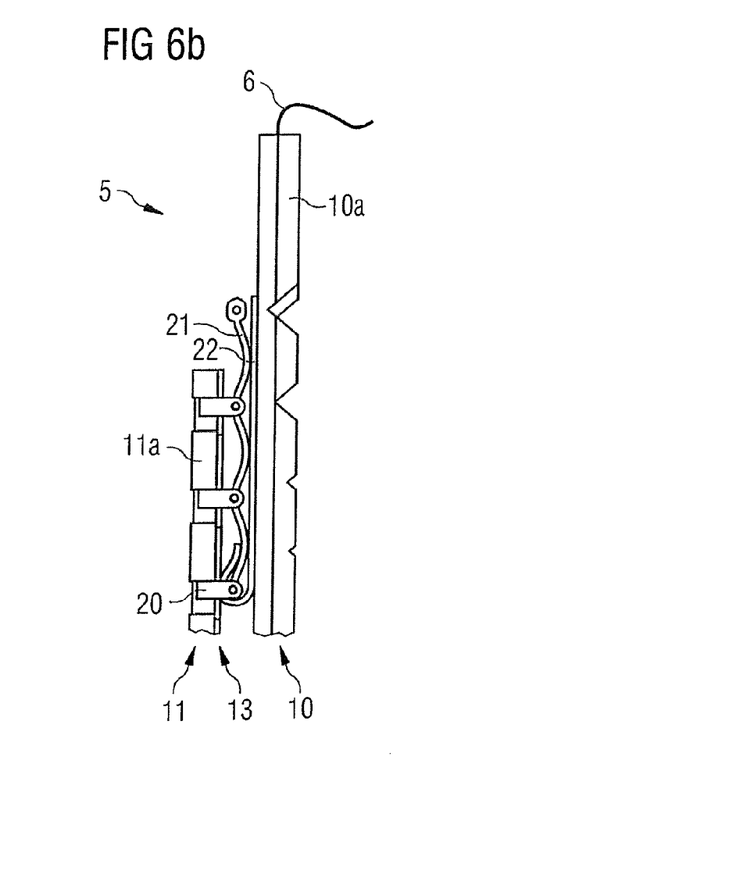

FIG. 6b shows a belt pad 5 with a skeleton 20 similar to the skeleton 20 of FIG. 6a. The belt pad 5 comprises a lower component 10 and an upper component 11. The lower component 10 comprises a cushioning element 10a attached to the lower part 21 of the skeleton 20. The upper component 11 comprises a cushioning element 11a attached to the upper part 22 of the skeleton 20. An attachment strap 6 is attached to the lower component 10. Integrated into a child safety seat in accordance with the invention, the lower component 10 will be placed on the chest of a child sitting in the child safety seat. The upper component 11 will then face away from the child. A shoulder strap can then be guided through the belt guiding channel 13 of the belt pad 5. In a front crash the child will be restrained in the child safety seat by the shoulder strap. Therefore, the shoulder strap will exert a force on the child via the lower component 10. The lower part 21 of the skeleton 20 will help to evenly distribute this force over the lower component 10. As a result, the lower component 10 will be evenly compressed, thus reducing the risk of potentially harmful local force peaks.

Figure 7A:
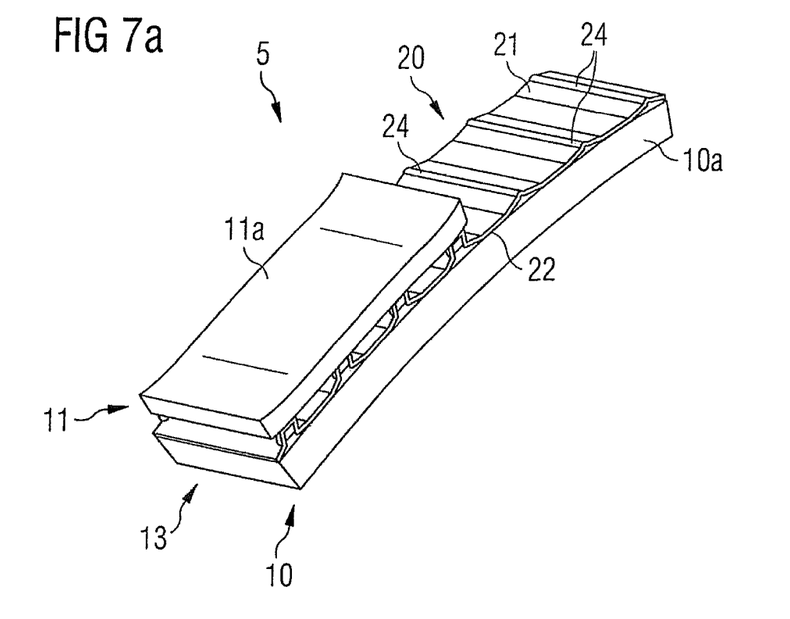
FIG. 7a is a perspective view of a belt pad of a child safety seat in accordance with another embodiment of the invention.

FIG. 7a shows a belt pad 5 according to another embodiment of the invention. This belt pad 5 is similar to the belt pad 5 of FIG. 6b. The skeleton 20 of this belt pad 5, however, does not comprise any rolls. The skeleton 20 again comprises a lower part 21 and an upper part 22 which are configured to define a belt guiding channel 13. The lower part 21 comprises elevated ridges 24 which are designed to reduce the area of contact between a strap guided through the belt guiding channel 13 and the lower part 21 of the skeleton 20. When the belt pad 5 is installed in a child safety seat in accordance with the invention and a tensioned shoulder strap runs through the belt guiding channel 13 restraining a child in the child safety seat, the shoulder strap will rest on the ridges 24 of the lower part 21 of the skeleton 20. Therefore, the shoulder strap can glide smoothly through the belt pad 5.

Figure 7B:
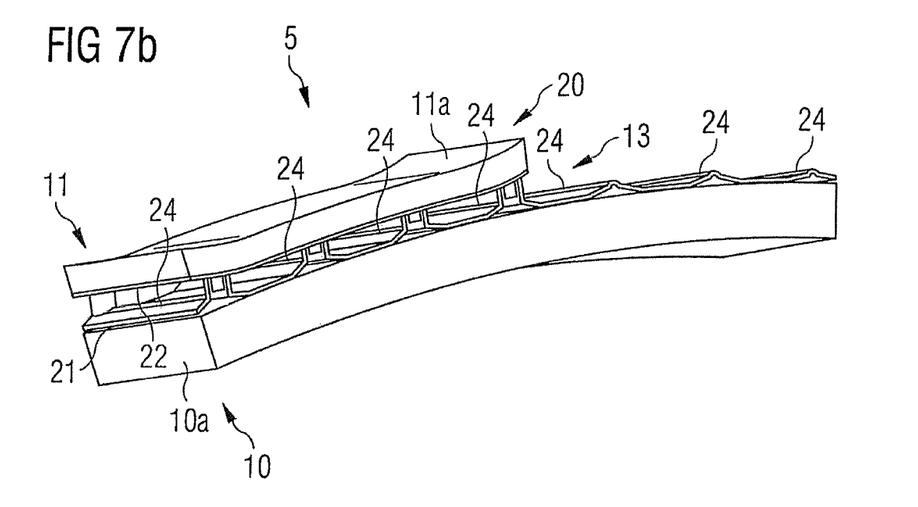

FIG. 7b shows another perspective view of the belt pad 5 of FIG. 7a.

Figure 8A:
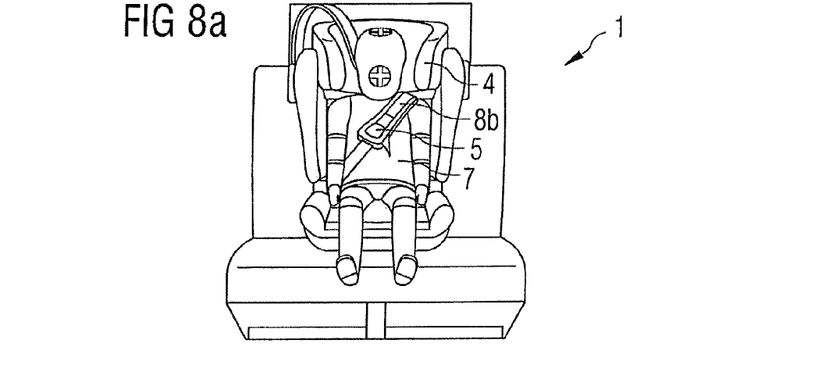
FIG. 8a is a front view of the child safety seat of FIG. 1b, wherein the child is seated in the child safety seat in an erect position typically adopted during normal travel.
Figure 8B:
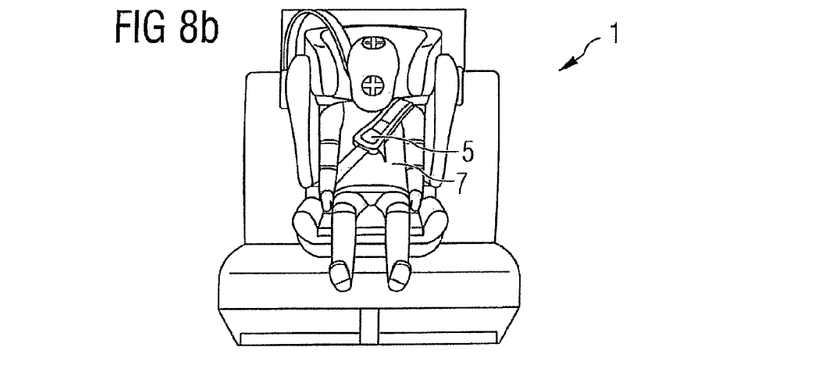
FIG. 8b is a front view of the child safety seat of FIG. 8a, wherein the child is shown leaning slightly forward due to forces experienced in the course of a frontal crash.
Figure 8C:
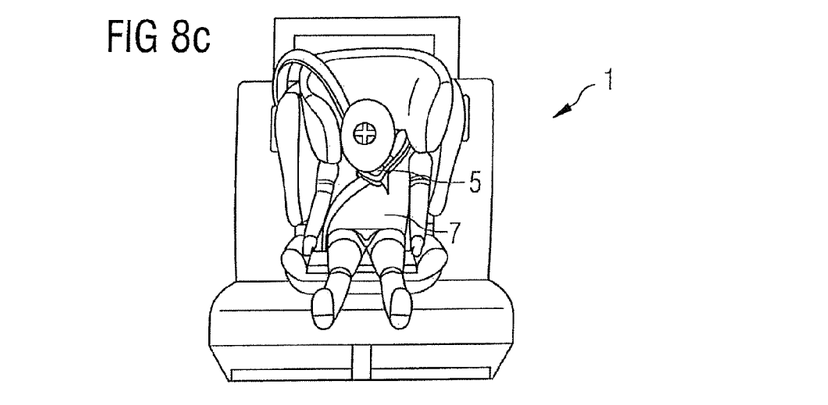
FIG. 8c is a front view of the child safety seat of FIG. 8b, wherein, in a later stage of the crash, the child's chin is contacting the belt pad.

FIGS. 8a-c show how a child safety seat 1 in accordance with the invention and a child 7 sitting in the child safety seat 1 are displaced during a typical front crash of the vehicle carrying child safety seat 1. The timelines given are exemplary values for a specific load scenario. Other load scenarios will result in other timelines.

FIG. 8a shows the position of child safety seat 1 and child 7 at the moment of the impact (time 0 ms). The child safety seat 1 rests firmly on a seat of the vehicle with the backrest 2 of the child safety seat 1 leaning against the backrest of the vehicle seat. The child 7 sits in an erect position with its head placed on the headrest 4 and the shoulder strap 8b running across its torso. The belt pad 5 is installed on the shoulder strap 8b and placed in an upper region of the child's 7 torso. The safety belt 8 with lap strap 8a and shoulder strap 8b runs tightly across the child's 7 body since it is tensioned by a tensioning device conventionally provided in vehicles for tensioning of the safety belt. The regions of the belt pad 5 in contact with the shoulder strap 8b are configured to minimize the friction between the belt pad 5 and the shoulder strap 8b. Since in the configuration shown in FIG. 8a the shoulder strap 8b is only slightly tensioned and the child 7 does not apply any extra forward force on the belt pad 5, the friction between the belt pad 5 and the shoulder strap 8b is on a minimum level. This way, it is ensured that the shoulder strap 8b can run through the belt pad 5 with minimal obstruction. As a result, safe webbing retraction and reliable tensioning of the safety belt 8 can be achieved. This situation is typically essentially maintained during "phase 0" of the crash, i.e. from 0 ms to about 20 ms.

FIG. 8b shows child 7 and child safety seat 1 in "phase 1" of the crash, i.e. about 20-90 ms after the impact. Due to the forces acting on child 7 and child safety seat 1 during the crash, child 7 and child safety seat 1 have been displaced towards the front of the vehicle. Since the child safety seat 1 is attached to the vehicle seat in a lower region of the child safety seat 1 (either by the lap strap 8a or by dedicated attachment means such as ISOFIX latches), whereas the upper part of the backrest 2 of the child safety seat 1 is not fixedly attached to the vehicle seat, crash-induced forces have rotated the child safety seat 1 forward. During this phase of the crash the child 7 is being accelerated (relative to the vehicle seat) and therefore moves towards the front of the vehicle with increasing speed. As a result, the compression between the chest of the child 7 and the shoulder strap 8b starts to increase. Since the first component of the belt pad 5 is disposed between the chest of child 7 and the shoulder strap 8b, the first component of the belt pad 5 is being increasingly compressed during this phase of the crash. Therefore, belt pad 5 reduces the load on child 7. During "phase 1", typically about 60 ms after the impact, head rotation starts, i.e. the head of child 7 begins to bend forward.

FIG. 8c shows child 7 and child safety seat 1 in "phase 2" of the crash, i.e. about 60-80 ms after the impact. Now the first component of the belt pad 5 is completely compressed. Since head rotation has continued, the chin of child 7 is now contacting the second component of the belt pad 5. As the head keeps rotating forward, the second component of the belt pad 5 will be compressed increasingly, thus slowing down the head rotation. This damping effect achieved by belt pad 5 will further reduce the loads received by the child's 7 head during the crash.

The invention claimed is:

1. A child safety seat for transporting a child in a vehicle, wherein the child safety seat is configured for the child to be secured to the child safety seat with a safety belt of the vehicle comprising a shoulder strap and a lap strap, wherein the child safety seat comprises:
   a belt pad which is adapted to be arranged on the shoulder strap of the safety belt; and
   a fastening device connecting the belt pad to the child safety seat, wherein the belt pad comprises a belt guiding channel configured to receive a section of the shoulder strap of the safety belt of the vehicle, wherein the belt pad comprises an upper component hingedly connected to a lower component, wherein the lower component is configured to be positioned between the safety belt and the child when the child is seated in the child safety seat and is secured in the child safety seat with the safety belt, and wherein the upper component is configured to be positioned on a first side of the safety belt opposite to a second side of the safety belt the lower component is positioned on.

2. A child safety seat according to claim 1, wherein the lower component comprises a first damping element and the upper component comprises a second damping element.

3. A child safety seat according to claim 2, wherein the first damping element of the lower component is softer than the second damping element of the upper component.

4. A child safety seat according to claim 1, wherein the fastening device comprises a strap of adjustable length.

5. A child safety seat according to claim 1, further comprising a backrest and a headrest, wherein the headrest is mounted to the backrest to be adjustable in height, and wherein the fastening device is connected to the headrest.

6. A child safety seat according to claim 5, wherein the headrest comprises a coupling component for coupling the headrest to the backrest and wherein the fastening device is rotatably connected to the back of the headrest above the coupling component to allow the fastening device to be guided from the back of the headrest to the front of the backrest optionally either across an edge of the backrest located to the left of the coupling component or across an edge of the backrest located to the right of the coupling component.

7. A child safety seat according to claim 1, wherein the belt guiding channel comprises a friction reducing structure adapted to ensure that the area of contact between the belt pad and the safety belt is smaller than the surface area of the section of the safety belt guided through the belt guiding channel to ensure that the safety belt does not fully contact the belt pad.

8. A child safety seat according to claim 1, wherein the upper component comprises a mixture of polyamide and elastane fibres.

9. A child safety seat according claim 1, wherein the child safety seat does not comprise an integral harness for securing the child in the child safety seat.

10. A child safety seat according to claim 1, wherein the belt pad is configured to be positioned in the chest area of the child by receiving only the shoulder strap but not the lap strap of the safety belt of the vehicle.

11. A child safety seat according to claim 1, wherein the upper component comprises a positioning element and the lower component comprises a recess, wherein the recess is configured to receive the positioning element when the belt pad is in a closed position.

12. A child safety seat according to claim 1, wherein the upper component comprises a locking device configured to lock the belt pad in a closed position.

13. The use of a belt pad with a child safety seat for transporting a child in a vehicle, wherein the child safety seat is configured for the child to be secured to the child safety seat with a safety belt of the vehicle comprising a shoulder strap and a lap strap, wherein the belt pad comprises an upper component hingedly connected to a lower component and a belt guiding channel configured to receive a section of the safety belt of the vehicle, the method of use comprising the steps of:
- folding the upper component away from the lower component to an open position thereby exposing the belt guiding channel;
- inserting a section of the shoulder strap into the belt guiding channel;
- folding the upper component toward the lower component to a closed position thereby at least partially covering the belt guiding channel and the section of the shoulder strap inserted therein.

14. The method of use according to claim 13 further comprising the step of: positioning the belt pad in the chest area of the child so that at least a portion of the belt pad is located between the shoulder strap and the body of the child.

15. The method of use according to claim 13 further comprising the step of:
- positioning the lower component between the safety belt and the child when the child is seated in the child safety seat and positioning the upper component on a first side of the safety belt opposite to a second side of the safety belt on which the lower component is positioned.

16. The method of use according to claim 13, wherein folding the upper component toward the lower component to partially cover the belt guiding channel and the section of the shoulder strap inserted therein further comprises engaging a positioning element of the upper component with a recess of the lower component to ensure the belt pad is in the closed position.

* * * * *

UNITED STATES PATENT AND TRADEMARK OFFICE
CERTIFICATE OF CORRECTION

PATENT NO. : 9,694,783 B2
APPLICATION NO. : 14/199390
DATED : July 4, 2017
INVENTOR(S) : Martin Haas et al.

Page 1 of 1

It is certified that error appears in the above-identified patent and that said Letters Patent is hereby corrected as shown below:

On the Title Page

Item (30), "Mar. 13, 2013 (EP) ..........13001256" should read -- Mar. 13, 2013 (EP)..........13001256.0 --.

Signed and Sealed this
Seventeenth Day of July, 2018

Andrei Iancu
*Director of the United States Patent and Trademark Office*